(12) United States Patent
Wang et al.

(10) Patent No.: US 8,014,963 B2
(45) Date of Patent: Sep. 6, 2011

(54) CORRECTION OF SENSOR NON-EQUIPOTENTIALITY IN A RESISTIVITY IMAGING DEVICE

(75) Inventors: Tsili Wang, Katy, TX (US); Stanislav W. Forgang, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 490 days.

(21) Appl. No.: 12/202,687

(22) Filed: Sep. 2, 2008

(65) Prior Publication Data

US 2009/0224766 A1 Sep. 10, 2009

Related U.S. Application Data

(63) Continuation-in-part of application No. 11/653,542, filed on Jan. 16, 2007, now Pat. No. 7,437,251.

(51) Int. Cl.
*G01R 35/00* (2006.01)

(52) U.S. Cl. ............... 702/57; 702/6; 324/373; 324/369; 324/355; 324/338; 324/366

(58) Field of Classification Search ................ 702/6, 57; 324/373, 369, 355, 338, 366
See application file for complete search history.

(56) References Cited

U.S. PATENT DOCUMENTS

| | | | |
|---|---|---|---|
| 3,944,910 A | 3/1976 | Rau | |
| 5,243,290 A | 9/1993 | Safinya et al. | |
| 5,519,668 A * | 5/1996 | Montaron | 367/35 |
| 5,899,958 A | 5/1999 | Dowell et al. | |
| 6,373,254 B1 | 4/2002 | Dion et al. | |
| 6,600,321 B2 | 7/2003 | Evans | |
| 6,653,839 B2 * | 11/2003 | Yuratich et al. | 324/355 |
| 6,714,014 B2 | 3/2004 | Evans et al. | |
| 7,095,233 B1 * | 8/2006 | Tabanou et al. | 324/369 |
| 7,256,582 B2 * | 8/2007 | Gorek et al. | 324/373 |
| 2007/0103161 A1 * | 5/2007 | San Martin et al. | 324/366 |

OTHER PUBLICATIONS

Bonner S, Bagershi, A., Clard, B., Dajee, G., Dennison, M., Hall, J.S., Jundt, H., Lovell, J., Rosthal, and Allen, D., 1994, A new generation of electrode resistively measurements for formation evaluation while drilling, SPWLA 35th Ann. Logging Symp., paper OO. 1 page.

Cheung, P., Pittman, D., Hayman, A., Laronga, R., Vessereau, P., Ounadjela, A., Desport, O., Hansen, S., Kear, R., Lamb, M., borbas, T., and Wendt, B., Jun. 17-20, 2001, Field test results of a new oil-base mud formation imager tool: SPWLA 42nd Ann. Logging Symp., paper XX. 14 pages.

(Continued)

*Primary Examiner* — Carol S Tsai
(74) *Attorney, Agent, or Firm* — Cantor Colburn LLP (57) ABSTRACT

A method for correcting data from a sensor electrode in a sensor includes determining a potential difference (V) between the sensor electrode and another sensor electrode; from the potential difference (V), determining a by-pass current ($I_c$) between the sensor electrode and the another sensor electrode; and from the by-pass current ($I_c$) and a measured current (I) from the sensor electrode, determining a corrected current (J) for the sensor electrode; wherein determining a potential ($V_1$) for the sensor electrode comprises multiplying an intrinsic impedance ($Z_{i1}$) by the measured current (I). A computer program product and other embodiments are provided.

4 Claims, 5 Drawing Sheets

OTHER PUBLICATIONS

Kleinberg, R.L., chew, W.c., chow, E.Y., clark, B., and Griffin, D.D., 1988 Microinduction sensor for the oil-based mud dipmeter, SPE 16761. pp. 733-742.

Lofts, J. Evans, M., Pavlovic, M., and Dymmock, S., Jun. 2-5, 2002, A new microresistivity imaging device for us in nonconductive and oil-based muds: SPWLA 43rd Ann. Logging Symp., paper II. 14 pages.

Longton, M.J., and Amiard, J.P., Sep. 14-16, 1988, Improved interpretation in oil based mud systems using the 200 MHz dielectric tool, Oslow SPWLA European Symp. 23 pages.

Rosthal, R.A., Young, R.A., Lovell, J.R., Buffington, L., and Arcenearus, C.L., Jr., 1995, Formation evaluation and geological interpretation from the resistively-at-the bit tool: SPE 30550. pp. 187-199.

* cited by examiner

CORRECTION OF SENSOR NON-EQUIPOTENTIALITY IN A RESISTIVITY IMAGING DEVICE

CROSS REFERENCE TO RELATED APPLICATION

This application is a continuation in part application of U.S. Ser. No. 11/653,542, filed Jan. 16, 2007, the contents of which are incorporated by reference herein in their entirety.

BACKGROUND OF THE INVENTION

1. Field of the Invention

The invention disclosed herein relates to subterranean imaging and, in particular, to improvement of electrode responses providing for resistivity imaging within a wellbore.

2. Description of the Related Art

Imaging of formations surrounding boreholes provides valuable information for describing geologic features. Some of the features include structural framework, fracture patterns, sedimentary features, and in-situ stress orientation. High-resolution wellbore images are used as an aid in providing conventional core description and determining orientation. Information obtained using such image is also useful for determining aspects of formation testing, sampling, perforating and other such tasks. For thinly laminated turbidite sands and other sequences, these images are often the only practical method of determining net sand and deposit thicknesses.

A particular challenge has been obtaining micro-resistivity images in wells drilled with non-conductive (commonly referred to as "oil-based") drilling fluids. Various instruments have been devised to provide images from wells having non-conductive drilling fluids.

One instrument for making resistivity measurements in non-conductive mud is available from Baker Hughes, Incorporated of Houston Tex. The instrument, referred to as an "Earth Imager," has provided resistivity images in wells drilled with non-conductive drilling fluids.

In some embodiments, the instrument includes six separate pads placed on articulating arms, with each pad including sensor electrodes. A known voltage difference between a return electrode and the sensor electrodes on the pads is used to create a current flow through the formation being imaged. The return electrode and the pad with sensor electrodes are separated by an electrical isolator.

In a typical embodiment, each pad contains a set of eight measuring sensor electrodes together with two focusing electrodes—all surrounded by conductive housings. In some embodiments, the sensor electrodes are referred to as "button electrodes." To force the measuring sensor current to flow into the formation perpendicular to the instrument near the pad external surface faced to the wellbore wall a control circuitry maintains a zero voltage difference between the focusing electrode and the measuring sensors, this is commonly known as current focusing.

The individual current measurement recorded from each sensor electrode is a function of the formation conductivity and the voltage applied. High resolution images are achieved by sampling at a high rate (for example, about 120 samples per foot) the readings from the forty eight sensor electrodes mounted on the six pads.

Figure 1:
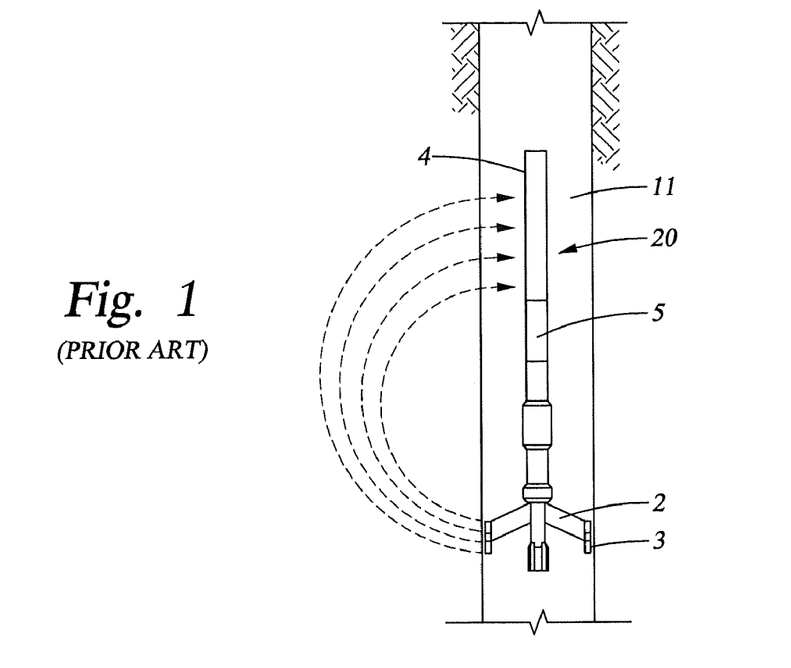
FIG. 1 depicts a prior art instrument for performing resistivity measurements in a wellbore.

Reference may be made to FIG. 1. In FIG. 1, there is shown a depiction of the prior art instrument for performing resistivity imaging in oil based drilling fluids. In this example, the instrument 20 is disposed within a wellbore 11. The instrument 20 includes pads 3 mounted on articulating arms 2. The articulated pads 3 are typically pressed up against a wall of the wellbore 11 to make firm contact therewith. As shown in FIG. 1, current flows from the pads 3 to a return electrode 4. The return electrode 4 is electrically separated from each of the pads 3 by an isolator 5.

In typical embodiments, the instrument 20 operates in non-conductive drilling fluids and provides a current having a frequency f of about 1 MHz. At this frequency f, the capacitive impedance $Z_c$ of the drilling fluid drops to a value reasonably small for further measurements and may be determined by Eq. 1:

$$Z_c = k(1/(f \times C)) \qquad \text{Eq. (1),}$$

where:
f represents the frequency;
C represents capacitance associated with the gap (standoff) between a respective sensor and a conductive borehole wall, when the gap is filled with drilling fluid;
k represents a constant;

Total electrical current I(m) through the sensor electrode, being related by Eq. (2):

$$I(m) = V/(Z_c + R) \qquad \text{Eq. (2),}$$

where:
V represents a known voltage between sensor electrodes and return electrodes;
I(m) represents a measured current for the sensor electrode; and
R represents a resistor having a value reflecting losses in a formation which are in unique dependency from formation resistivity $R_f$.

At a sufficiently high frequency f, contribution of the capacitive impedance $Z_c$ could become negligible, hence, Eq. 3 is realized:

$$R_f = a(V/I(m)) \qquad \text{Eq. (3).}$$

where:
a represents a hardware dependent constant typically determined during instrument manufacturing and calibration processes.

Figure 2A:
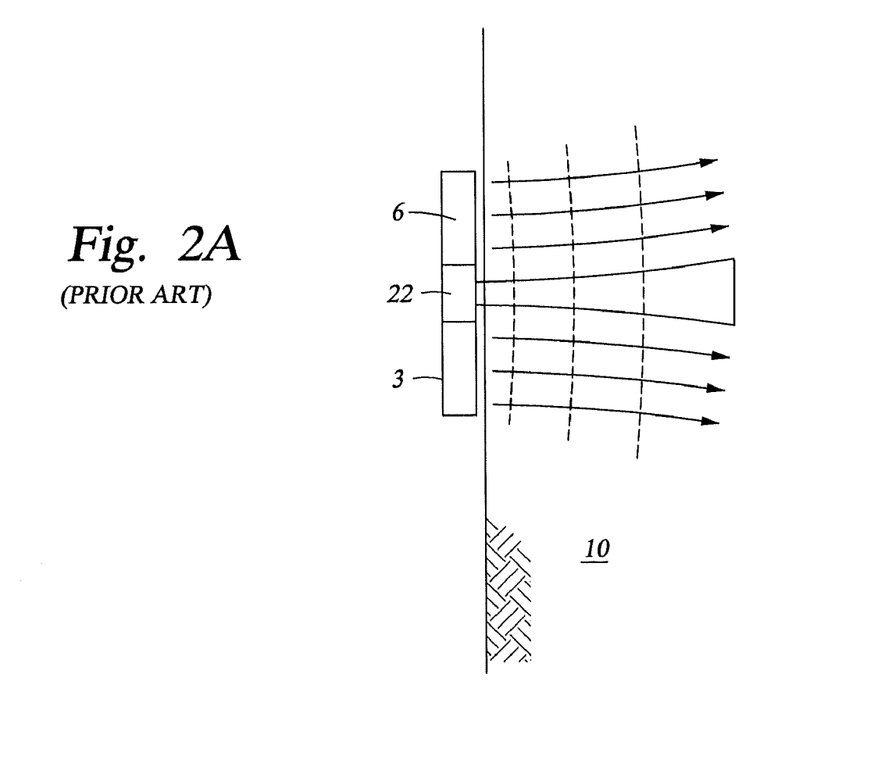
FIG. 2A, FIG. 2B and FIG. 2C, collectively referred to herein as FIG. 2, depict aspects of electrodes for the instrument of FIG. 1.
Figure 2B:
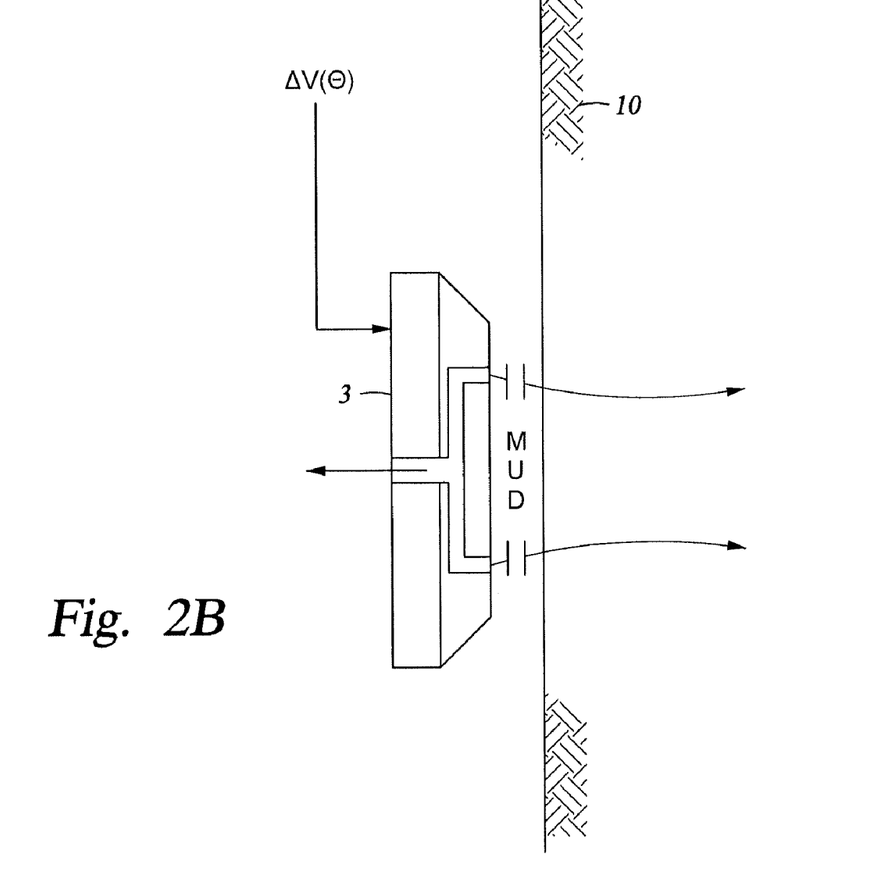
Figure 2C:
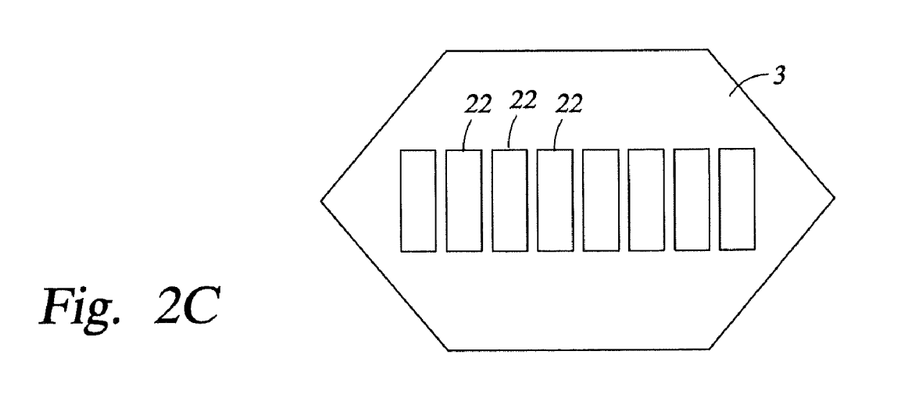

Referring also to FIG. 2, aspects of the prior art pad 3 in relation to a formation 10 are depicted. In FIG. 2A, aspects of current distribution in the formation 10 are shown, where a sensor electrode 22 provides a current into the surrounding formation 10. In FIG. 2B, aspects of capacitive coupling between the pad, the non-conductive mud, and the formation 10 are shown. In FIG. 2C, a frontal view of the pad 3 is depicted. The frontal view also depicts a plurality of the sensor electrodes 22.

As one skilled in the art may understand, the operation theory is oriented to flawless operation and does not account for real-life imperfections. In particular, the above-mentioned pad construction requires high degree of equipotentiality between the sensor electrodes. If the condition has not been met, as one might imagine, the proximity of each of the sensor electrodes 22 to other sensor electrodes 22 can create problems. For example, unavoidable capacitive coupling between neighboring sensor electrodes and/or between sensor electrodes and pad electronics (such as a ground plate) represents a by-pass where a formation current to be measured by each sensor electrode could be partially re-routed. Additionally, non-equipotentiality results in potential difference between buttons that, in turn, induces a current passing through an insulator separating these electrodes. Influence of these in-pad imperfections increases with increasing frequency f and does not include any information about resistivity $R_f$ of the formation. Rather, these imperfections degrade the pad performance, smooth collected images and reduce image resolution.

Therefore, what is needed is a technique for reducing pad imperfections and for minimizing effects of capacitive coupling between sensor electrodes. Preferably, the technique includes ways to correct effects of this capacitive coupling thus providing for restoration of image quality.

BRIEF SUMMARY OF THE INVENTION

Disclosed is a method for correcting data from a sensor electrode in a sensor includes determining a potential difference (V) between the sensor electrode and another sensor electrode; from the potential difference (V), determining a by-pass current ($I_c$) between the sensor electrode and the another sensor electrode; and from the by-pass current ($I_c$) and a measured current (I) from the sensor electrode, determining a corrected current (J) for the sensor electrode; wherein determining a potential ($V_1$) for the sensor electrode comprises multiplying an intrinsic impedance ($Z_{i1}$) by the measured current (I).

Also disclosed is a computer program product having machine readable instructions stored on machine readable media, the instructions for correcting data from a sensor electrode of a sensor, by implementing a method including: determining a potential difference (V) between the sensor electrode and another sensor electrode; from the potential difference (V), determining a by-pass current ($I_c$) between the sensor electrode and the another sensor electrode; and from the by-pass current ($I_c$) a measured current (I) from the sensor electrode, determining a corrected current (J) for the sensor electrode; wherein determining a potential ($V_1$) for the sensor electrode comprises multiplying an intrinsic impedance ($Z_{i1}$) by the measured current (I).

In addition, a method for determining impedance between a sensor electrode and a return electrode in a sensor of a resistivity imaging device is provided and calls for using the resistivity imaging device for imaging a formation surrounding a wellbore; determining a potential difference (V) between the sensor electrode and another sensor electrode; determining a by-pass current ($I_c$) between the sensor electrode and the another sensor electrode from the potential difference (V); from the by-pass current ($I_c$) and a measured current (I), determining a corrected current (J) for the sensor electrode; and from the corrected current (J) and a potential difference ($V_0-V_1$) between the return electrode and the sensor electrode, determining the impedance (Z) between the sensor electrode and the return electrode.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION OF THE INVENTION

Disclosed are techniques for reducing or substantially eliminating capacitive coupling of sensor electrodes in a sensor. The sensor referred to herein is typically used as a component of an imaging instrument. The imaging instrument is useful for making resistivity measurements when either one of logging with a non-conductive drilling fluid and measuring while drilling (MWD) with a non-conductive drilling fluid. For purposes of the discussion herein, the imaging instrument is used while logging (separate from a drilling procedure). However, one skilled in the art will recognize that this is illustrative and not limiting of the teachings herein.

Figure 3:
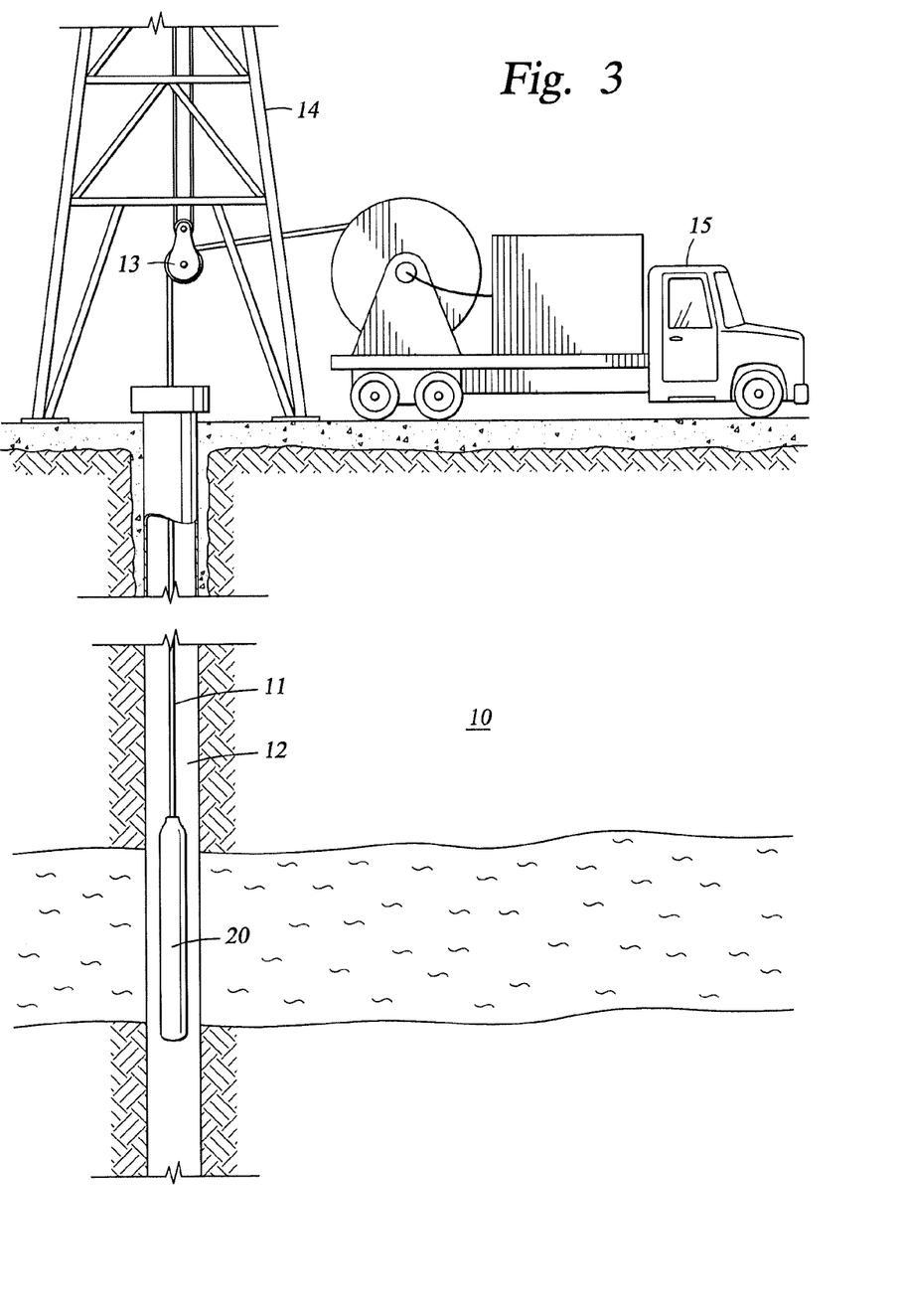
FIG. 3 depicts an exemplary deployment of a instrument used for resistivity imaging.

Aspects of logging a well using the instrument disclosed herein are depicted in FIG. 3. In FIG. 3, a cross-section of earth formations 10 along the length of a penetration referred to as a "wellbore" 11 is depicted. Usually, the wellbore 11 is at least partially filled with a mixture of liquids including water, drilling fluid, mud, oil and formation fluids that are indigenous to the formations 10 penetrated by the wellbore 11. Drilling mud may also be introduced into the wellbore 11 as is known in the art. Suspended within the wellbore 11 at the bottom end of a wireline 12 is the imaging instrument 20. The wireline 12 is often carried over a pulley 13 supported by a derrick 14. Wireline 12 deployment and retrieval is typically performed by a powered winch carried by a service truck 15.

As is known in the art, at least one of the imaging instrument 20 and the service truck 15 include electronics and support equipment as is needed for operating the imaging instrument 20. Included with the electronics and support equipment is a power supply for providing power to the imaging instrument 20, processing capabilities, data storage, memory and other such components. The power provided to the imaging instrument 20 may be delivered over a broad range of frequencies f, and currents I. Signal analysis may include known techniques for analog signal processing and digital signal processing as appropriate. As these and other aspects are known in the art, such aspects are generally not discussed in greater detail herein.

Typically, the sensor electrodes 22 are configured to emit (or receive) current I of frequency f ranging from about 1 MHz to about 10 MHz or higher. However, the sensor electrodes 22 may be operated at frequencies f above or below this range.

Figure 4:
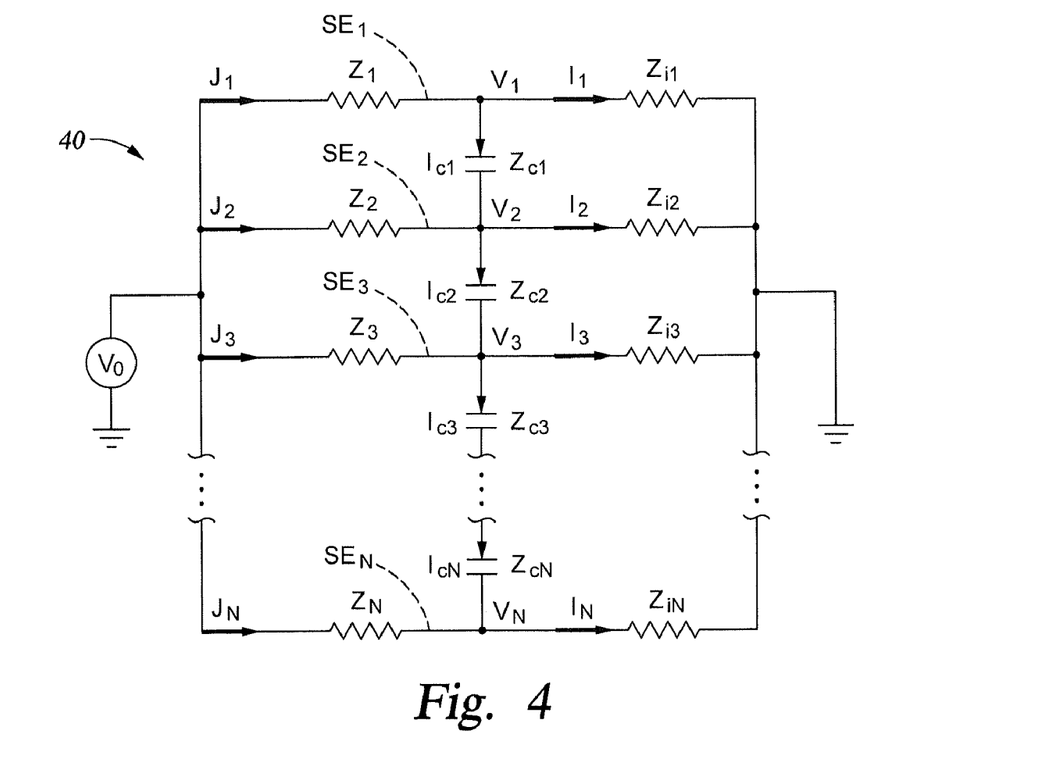
FIG. 4 depicts a functional aspects of sensor electrodes.

Referring now to FIG. 4, there are shown functional aspects of a circuit representation 40 for energizing sensor electrodes 22 of the imaging instrument 20. Note that the circuit representation 40 provided depicts aspects of functionality and performance characteristics for each sensor electrode 22, and that this circuit representation 40 is not to be construed as an accurate depiction of the components included in a circuit for driving a respective sensor electrode 22. Also, note that with reference to FIG. 4, the subscripts 1, 2, ... N for each quantity are associated with respective sensor electrodes 22.

In this exemplary representation, for each sensor electrode $SE_1, SE_2, \ldots SE_N$, a typical intrinsic sensor input impedance is represented by $Z_{i1}, Z_{i2}, \ldots, Z_{iN}$; capacitive coupling impedance (impedance between the sensor electrodes 22) is represented by $Z_{c1}, Z_{c2}, \ldots, Z_{cN}$; electrode/electrode impedance (impedance between a respective sensor electrode 22 and the return electrode 4) is represented by $Z_1, Z_2, \ldots, Z_N$ (note that the electrode/electrode impedance includes formation impedance and mud column impedance); potential at the surface of each sensor electrode is represented by $V_1, V_2, \ldots, V_N$; measured current from each sensor electrode is represented by $I_1, I_2, \ldots, I_N$; and corrected current from return electrode 4 flowing toward a respective sensor electrode 22 is represented by $J_1, J_2, \ldots, J_N$.

As FIG. 4 shows, corrected current $J_1, J_2, \ldots, J_N$ may be used to derive the formation impedance (which is accounted for in the electrode/electrode impedance $Z_1, Z_2, \ldots, Z_N$). When capacitive coupling between sensor electrodes 22 (such as those sensor electrodes that are adjacent to one another) is not negligible, the measured current $I_1, I_2, \ldots, I_N$ is different from the corrected current $J_1, J_2, \ldots, J_N$. Given that there is capacitance between the sensor electrodes 22, the capacitive coupling will not affect measurement only if the sensor electrodes are of an equipotential (i.e., the potential at the surface of each sensor electrode $V_1, V_2 \ldots V_N$ is substantially equal). However, when resistivity $\rho$ of the formation 10 causes change in the corrected current $J_1, J_2, \ldots, J_N$ for the plurality of sensor electrodes 22, the potential of each sensor electrode 22 among the plurality of sensor electrodes 22 necessarily changes (i.e., non-equipotentiality becomes inevitable).

Stated another way, assume that the intrinsic sensor impedance $Z_{i1}, Z_{i2}, \ldots, Z_{iN}$ is substantially equal over the plurality of sensor electrodes 22 and that the measured current $I_1, I_2, \ldots I_N$ is not substantially equal (i.e., varies) over the plurality of sensor electrodes 22. In this case, correction is required to remove effects of the coupling existing between the sensor electrodes 22.

In order to remove the effects of this capacitive coupling, certain factors are determined. First, the potential $V_1, V_2, \ldots, V_N$ for each sensor electrode 22 is calculated as follows:

$$V_1 = Z_{i1} I_1,$$

$$V_2 = Z_{i2} I_2,$$

$$\ldots$$

$$V_N = Z_{iN} I_N.$$

Next, by-pass current through the capacitive coupling $I_{c1}, I_{c2}, \ldots I_{cN}$ is calculated for each of the sensor electrodes 22:

$$I_{c1} = \frac{V_1 - V_2}{Z_{c1}},$$

$$I_{c2} = \frac{V_2 - V_3}{Z_{c2}},$$

$$\ldots$$

$$I_{cN} = \frac{V_{N-1} - V_N}{Z_{c(N-1)}}.$$

Then, the corrected current $J_1, J_2, \ldots, J_N$ is calculated as:

$$J_1 = I_1 + I_{c1},$$

$$J_2 = I_2 + I_{c2} - I_{c1},$$

$$\ldots$$

$$J_N = I_N - I_{c(N-1)}.$$

Finally, the electrode/electrode impedance $Z_1, Z_2, \ldots, Z_N$ is calculated:

$$Z_1 = (V_0 - V_1)/J_1,$$

$$Z_2 = (V_0 - V_2)/J_2,$$

$$\ldots$$

$$Z_N = (V_0 - V_N)/J_N.$$

After the electrode/electrode impedance $Z_1, Z_2, \ldots, Z_N$ is calculated for each of the sensor electrodes 22, the data from each sensor electrode 22 may be used to derive apparent resistivity $R_f$ (or inversely, the conductivity) for the formation 10 by applying respective geometric factors.

Figure 5:
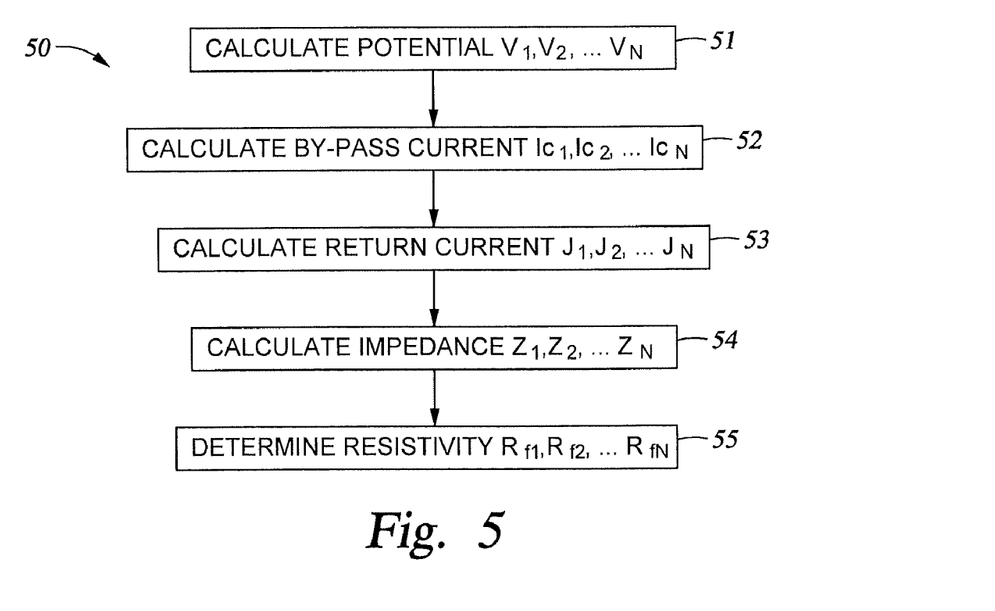
FIG. 5 depicts an exemplary method for addressing capacitive coupling when determining formation resistivity.

FIG. 5 provides a summary of these calculations and depicts an exemplary (and non-limiting) correction method 50. The correction method 50 calls for calculating the potential 51, then calculating the by-pass current 51, calculating the corrected current 53, calculating the impedance 54 and then determining the apparent resistivity 55. This method may be applied advantageously through use of computer program products to provide for real time, or near real time correction of data.

It should be recognized that the term "calculating" as used in some regards herein (such as "calculating the potential") may actually, in some embodiments, be supplanted by other techinques—such as measuring. Accordingly, the term "calculating" is illustrative of techniques for determining or otherwise arriving at a given value. Further, it is recognized that the calculations may include complex components, imaginary components and real components.

Figure 6:
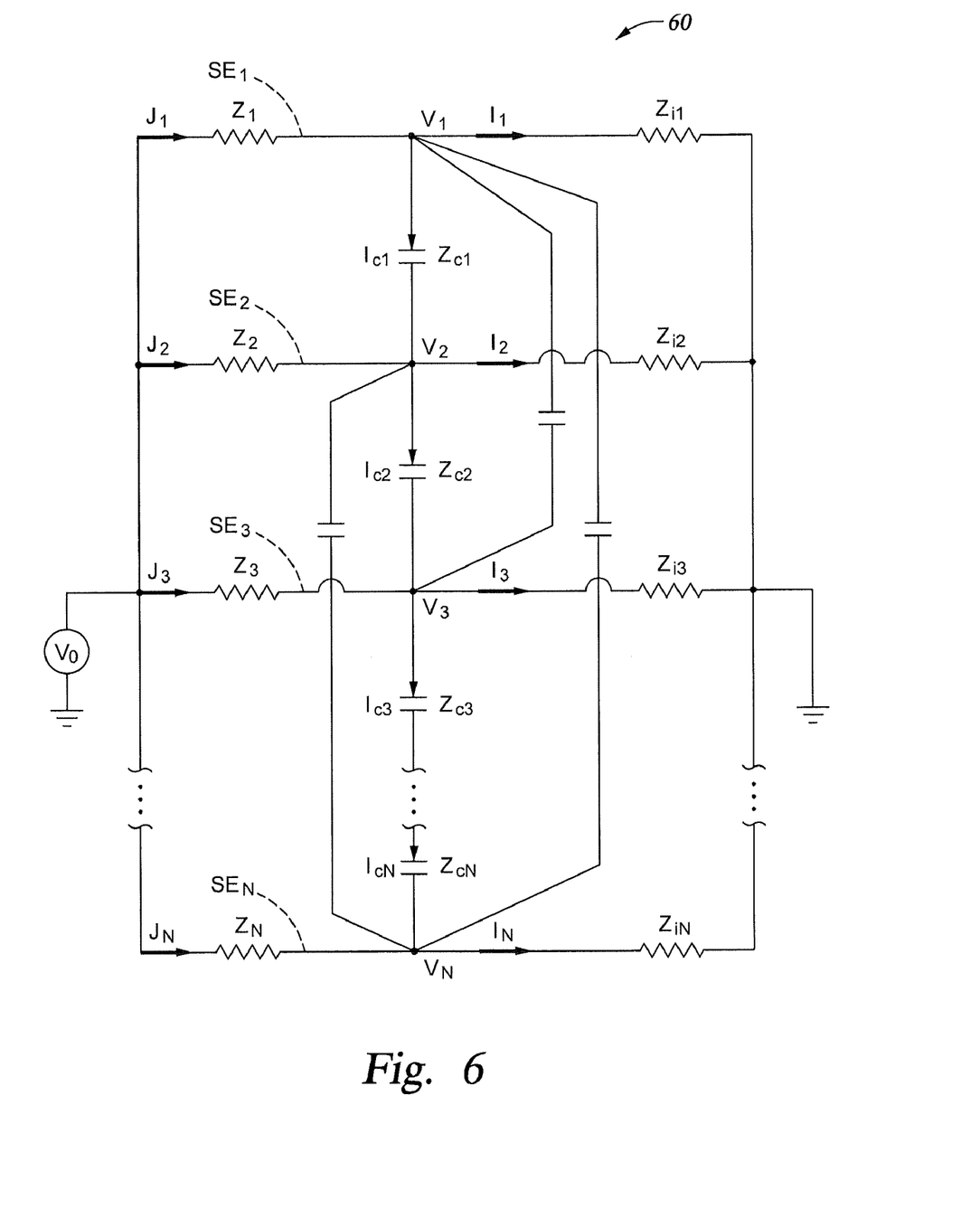
FIG. 6 depicts further functional aspects of sensor electrodes.

It has been determined that capacitive coupling is not limited to adjacent sensor electrodes 22. That is, capacitive coupling exists between various other pairs of sensor electrodes 22. In FIG. 6, a second representation 60 depicts aspects of this effect.

In FIG. 6, the second representation 60 depicts aspects of capacitive coupling. That is, in FIG. 6, in addition to capacitive coupling between a first sensor electrode $SE_1$ and a second sensor electrode $SE_2$, the first sensor electrode $SE_1$ is also capacitively coupled to a third sensor electrode $SE_2$ and an $N^{th}$ sensor electrode $SE_N$. Other capacitive couplings are also depicted. The techniques provided above in reference to FIG. 4 may be applied to address the capacitive coupling between non-adjacent sensor electrodes 22 (as depicted in FIG. 6).

The capacitive coupling correction methods described above apply when a resistive coupling, in addition to capacitive coupling, exists. In this case, the impedances $Z_{c1}, Z_{c2}, \ldots, Z_{c(N-1)}$ will include both capacitive and resistive contributions.

The capacitive coupling correction methods described above may be applied to both water-based mud and oil-based mud imaging devices. For water-based mud imaging devices, because the operating frequencies f are relatively low, the correction for the capacitive coupling effect could be small. However, overall corrections for non-equipotentiality still remains effective as these effects create potential differences driving parasitic galvanic currents between neighboring electrodes on the pad surface of the sensor. It is considered that for water-based mud, coupling between sensor electrodes 22 is primarily resistive.

For those skilled in the art it should be understood that in higher-frequency imaging devices some of the impedances shown the above could become complicated and complex. For instance, sensor intrinsic impedance could include input capacitances of electronic devices and board assemblies, inductance of connectors and terminals. There also could be a need for accounting for dielectric losses in insulator between sensor electrodes, etc. In some embodiments, accounting requires vector (complex) measurements of voltages and currents in order to apply the corrections. While performing vector measurements, there is a need to select a reference signal with an a-priori known initial phase. Conventionally this has been a voltage or current which is "common" for every sensor electrode. For example, in the case of the present invention, the above-mentioned potential voltage V could be chosen as a reference; however, other options also exist.

In support of the teachings herein, various analysis components may be used, including digital and/or an analog systems. The system may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

In some embodiments, the imaging instrument 20 includes a set of computer executable instructions stored on a computer readable medium for implementing the teachings herein.

Further, various other components may be included and called upon for providing for aspects of the teachings herein. For example, a sample line, sample storage, sample chamber, sample exhaust, pump, piston, power supply (e.g., at least one of a generator, a remote supply and a battery), vacuum supply, pressure supply, refrigeration (i.e., cooling) unit or supply, heating component, motive force (such as a translational force, propulsional force or a rotational force), magnet, electromagnet, sensor, electrode, transmitter, receiver, transceiver, controller, optical unit, electrical unit or electromechanical unit may be included in support of the various aspects discussed herein or in support of other functions beyond this disclosure.

One skilled in the art will recognize that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood by those skilled in the art that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for correcting data from a sensor electrode in a sensor, the method comprising:
    determining a potential difference (V) between the sensor electrode and another sensor electrode;
    from the potential difference (V), determining a by-pass current ($I_c$) between the sensor electrode and the another sensor electrode; and
    from the by-pass current ($I_c$) and a measured current (I) from the sensor electrode, determining a corrected current (J) for the sensor electrode;
    wherein determining a potential ($V_1$) for the sensor electrode comprises multiplying an intrinsic impedance ($Z_{i1}$) by the measured current (I).

2. A non-transitory machine readable medium containing computer instructions stored therein for causing a computer processor to perform instructions for correcting data from a sensor electrode of a sensor, by implementing a method comprising:
    determining a potential difference (V) between the sensor electrode and another sensor electrode;
    from the potential difference (V), determining a by-pass current ($I_c$) between the sensor electrode and the another sensor electrode; and
    from the by-pass current ($I_c$) and a measured current (I) from the sensor electrode, determining a corrected current (J) for the sensor electrode;
    wherein determining a potential ($V_1$) for the sensor electrode comprises multiplying an intrinsic impedance ($Z_{i1}$) by the measured current (I).

3. A method for determining impedance between a sensor electrode and a return electrode in a sensor of a resistivity imaging device, the method comprising:
    using the resistivity imaging device for imaging a formation surrounding a wellbore;
    determining a potential difference (V) between the sensor electrode and another sensor electrode;
    determining a by-pass current ($I_c$) between the sensor electrode and the another sensor electrode from the potential difference (V);
    from the by-pass current ($I_c$) and a measured current (I), determining a corrected current (J) for the sensor electrode; and
    from the corrected current (J) and a potential difference ($V_0-V_1$) between the return electrode and the sensor electrode, determining the impedance (Z) between the sensor electrode and the return electrode.

4. The method as in claim 3, wherein determining the potential ($V_1$) for the sensor electrode comprises multiplying an intrinsic impedance ($Z_{i1}$) by the measured current (I).

\* \* \* \* \*